Patented May 8, 1951

2,552,252

UNITED STATES PATENT OFFICE 2,552,252

N,N'-DIARYLTHIAZOLINOCARBOCYANINE DYES

Leslie G. S. Brooker, Rochester, N. Y., assignor to Eastman Kodak Company, Rochester, N. Y., a corporation of New Jersey No Drawing. Application March 26, 1948, Serial No. 17,390

12 Claims. (Cl. 260—240.65)

This invention relates to N,N'-diarylthiazolinocarbocyanine dyes and to a process for preparing the same.

In my copending application Serial No. 622,677, filed October 18, 1945 (now United States Patent 2,441,558, dated May 18, 1948), of which the instant application is a continuation-in-part, I have shown that N-arylthiazolinium quaternary salts containing a methyl group in the α-position can be prepared by condensing ethylene dibromide with N-thioacetylarylamines. As also shown in the aforesaid copending application, the N-arylthiazolinium quarternary salts can be condensed with trialkyl orthoformates to give N,N'-diarylthiazolinocarbocyanine dyes. I have also found that these N-arylthiazolinium quaternary salts can be condensed with other alkyl orthocarboxylates, e. g. alkyl orthoacetates and alkyl orthopropionates, etc. These N,N'-diarylthiazolinocarbocyanine dyes have the surprising property of not diffusing in photographic silver halide emulsions. In a group of comparative tests, N,N'-dialkylthiazolinocarbocyanine dyes distributed themselves almost uniformly between two layers of a multilayer coating of photographic gelatino-silver-halide emulsions in which the dye had been added only to one layer. Under comparable conditions, no diffusion of the N,N'-diarylthiazolinocarbocyanine dyes was detected.

It is, accordingly, an object of my invention to provide new dyes which sensitize photographic silver halide emulsions, but do not diffuse in the emulsions. A further object is to provide a process for preparing such dyes. Other objects will become apparent hereinafter.

The new dyes of my invention can be represented by the following general formula:

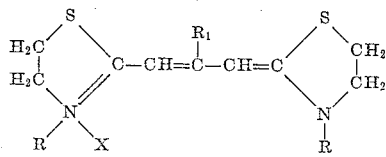

wherein R represents an aryl group, e. g. phenyl, α-naphthyl, p-chlorophenyl, p-methoxyphenyl, m-tolyl, o-tolyl, p-tolyl, β-naphthyl, p-cyanophenyl, p-dimethylaminophenyl, etc., $R_1$ represents a hydrogen atom, or an alkyl group, e. g. methyl, ethyl, etc., and X represents an anion, e. g. chloride, bromide, iodide, perchlorate, acetate, propionate, thiocyanate, sulfamate, etc.

To prepare these dyes, I condense a N-arylthiazolinium quaternary salt selected from those represented by the following general formula:

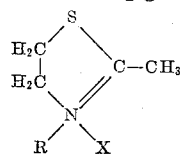

wherein R and X have the values given above, with an alkyl orthocarboxylate, e. g. trimethyl orthoformate, triethyl orthoformate, triisobutyl orthoformate, triisopropyl orthoformate, ethyldipropyl orthoformate, triisoamyl orthoformate, trimethyl orthoacetate, methyldiethyl orthoacetate, triisobutylorthoacetate, triethyl orthoacetate, triethyl orthopropionate, etc. The condensations are advantageously effected in the presence of an acid-binding agent, e. g. in pyridine, quinoline or isoquinoline, or in an alcoholic (methyl, ethyl, propyl, butyl, etc.) solution of a tertiary amine, e. g. triethylamine, triethanolamine, triisoamylamine, N-methylpiperidine, N-ethylpiperidine, etc.

The following examples will serve to illustrate further the manner of obtaining my new dyes.

*Example 1.—3,3'-diphenylthiazolinocarbocyanine perchlorate*

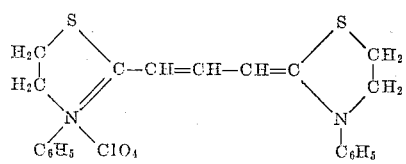

2.8 g. (2 mols.) of 2-methyl-3-phenylthiazolinium perchlorate, 2.2 g. (1 mol. + 200% excess) of ethyl orthoformate (i. e. triethylformate) and 20 cc. of pyridine were refluxed together for 3 hours, chilled, and the above dye precipitated by adding diethyl ether to the chilled mixture. Yield of crude dye 1.3 g. (46%). The crude dye was first triturated with 50 cc. of hot absolute ethyl alcohol, then after three recrystallizations from methyl alcohol (50 cc. per g. of dye), the dye was obtained as brown crystals, melting at 211 to 212° C. with decomposition. The dye sensitized a photographic gelatino-silver-chlorobromide emulsion to about 525 mµ with a maximum at about 495 mµ.

*Example 2. — 3,3'-(α-naphthyl)thiazolinocarbocyanine perchlorate*

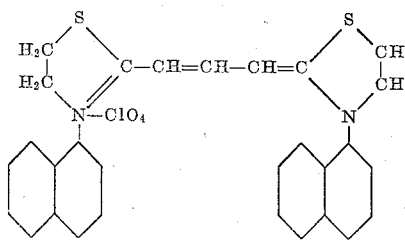

1.64 g. (2 mols.) of 2-methyl-3-(α-naphthyl)-thiazolinium perchlorate, 0.7 g. (1 mol. + 100% excess) of ethyl orthoformate (i. e. triethylformate) and 10 cc. of dry pyridine were refluxed together for 8 minutes. The dye began to separate from the hot reaction mixture. This mixture was cooled, filtered, product washed with 3 to 10 cc. portions of methyl alcohol and dried. Yield of crude dye 1.0 g. (35%). The purification of the dye was accomplished by first dissolving it in 10 cc. of boiling pyridine, filtering the hot pyridine solution, and adding hot water to this solution to turbidity. After two treatments as described, the dye was obtained as buff needles melting at 300 to 301° C. with decomposition. Yield 0.6 g. (21%). This dye sensitized a photographic gelatino - silver - chlorobromide emulsion to about 525 m$\mu$ with maximum sensitivity at about 495 m$\mu$.

*Example 3.— 7-methyl-3,3'-diphenylthiazolinocarbocyanine perchlorate*

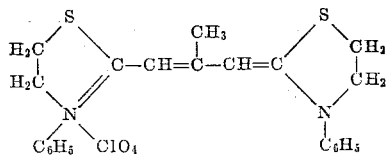

A mixture of 2.78 g. (2 mols.) of 2-methyl-3-phenyl-thiazolinium perchlorate, 2.43 g. (1 mol. +200% excess) of ethyl orthoacetate and 20 cc. of pyridine was heated at the refluxing temperature for 30 minutes. The cool reaction mixture was stirred with 250 cc. of ether. After chilling, the ether-pyridine layer was decanted and the sticky residue was washed with ether.. The residue was extracted with hot water. On chilling, there was obtained 0.50 g. of the desired dye. About 800 cc. of water was heated to the boiling point and the 0.50 g. of dye was added in several portions with stirring. The first crop of dye weighed 0.35 g. and had melting point 154–157° C. with decomposition. The orange crystals sensitized a photographic gelatino-silver-chlorobromide emulsion to about 545 m$\mu$ with maximum sensitivity at about 500 m$\mu$.

*Example 4.—7 - ethyl - 3,3' - diphenylthiazolinocarbocyanine perchlorate*

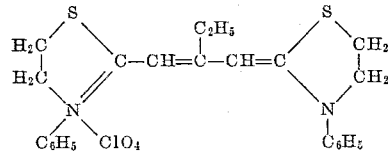

A mixture of 2.78 g. (2 mols.) of 2-methyl-3-phenylthiazolinium perchlorate, 2.64 g. (1 mol. +200% excess) of ethyl orthopropionate and 20 cc. of pyridine was heated at the refluxing temperature for 30 minutes. The dye was precipitated with ether, washed with ether, and the residue was extracted with hot water. About 1 liter of water was heated to the boiling point and the 0.60 g. of dye was added in several portions with stirring. The first crop of crystals melted at 129° C. with decomposition and previous darkening. The reddish-orange crystalline powder sensitized a photographic gelatino-silver-chlorobromide emulsion to about 540 m$\mu$ with maximum sensitivity about 505 m$\mu$.

In a manner similar to that illustrated in the foregoing examples, other N-arylthiazolinium quaternary salts, e. g. 2-methyl-3-($\alpha$-naphthyl)-thiazolinium bromide, 2-methyl-3-($\beta$-naphthyl)-thiazolinium bromide, 2 - methyl - 3 - (p-chlorophenyl)thiazolinium perchlorate, 2 - methyl - 3 - (p-tolyl)thiazolinium perchlorate, etc. can be condensed with alkyl orthocarboxylates to give carbocyanine dyes.

Sensitization by means of the herein-described dye is primarily directed to the ordinarily employed gelatino - silver - halide developing - out emulsions, e. g. the gelatino-silver-chloride, chlorobromide, chlorobromoiodide, bromide and bromoiodide emulsions. Both washed and unwashed emulsions can be sensitized. The concentration of these dyes in the emulsion can vary widely, i. e. from about 5 to about 100 mg. per liter of flowable emulsion. The concentration of the dye will vary according to the type of light-sensitive material in the emulsion and according to the effect desired. The suitable and most economical concentration for any given emulsion will be apparent to those skilled in the art upon making the ordinary tests and observations customarily used in the art of emulsion making.

To prepare a gelatino-silver-halide emulsion sensitized with one or more of these dyes, the following procedure is satisfactory. A quantity of the dye or dyes is dissolved in methyl alcohol and a volume of this solution (which may be diluted with water) containing from 5 to 100 mg. of dye is slowly added to about 1000 cc. of gelatino-silver-halide emulsion with stirring. The dye should be uniformly distributed throughout the emulsion. With most of these dyes from 10 to 40 mg. of dye per liter of emulsion suffices to produce the maximum sensitizing effect.

The above statements are only illustrative and are not to be understood as limiting my invention, as it will be apparent that these dyes can be incorporated by other methods in any of the photographic silver halide emulsions employed in the art. For instance, the dyes may be incorporated by bathing a plate or film upon which an emulsion has been coated in a solution of the dye in an appropriate solvent. Bathing methods, however, are not to be preferred ordinarily.

Since the dyes of this invention do not diffuse in photographic silver halide emulsions they are especially useful in the sensitization of emulsions used in mixed grain or multilayer photographic elements, such for example as are described in United States Patents 2,384,598, dated September 11, 1945; 2,358,169, dated September 12, 1944; 2,358,060, dated September 12, 1944; 1,055,155, dated March 4, 1931; 2,304,940, dated December 15, 1942; 2,322,027, dated June 15, 1943 or British Patent 581,772, accepted October 24, 1946.

What I claim as my invention and desire to be secured by Letters Patent of the United States is:

1. A N,N'-diarylthiazolinocarbocyanine dye selected from those represented by the following general formula:

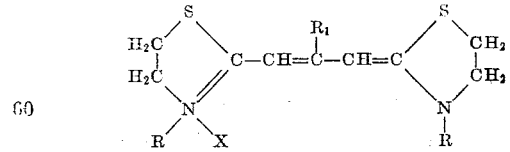

wherein R represents an aryl group, R$_1$ represents a member selected from the group consisting of a hydrogen atom, a methyl group and an ethyl group and X represents an anion.

2. A N,N'-diarylthiazolinocarbocyanine dye selected from those represented by the following general formula:

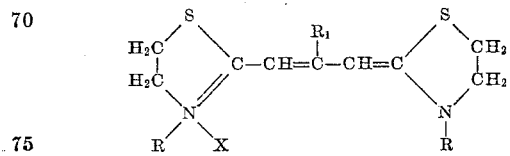

wherein R represents an aryl group selected from those of the benzene and of the naphthylene series, $R_1$ represents a member selected from the group consisting of a hydrogen atom, a methyl group and an ethyl group and X represents an anion.

3. 3,3'-diphenylthiazolinocarbocyanine perchlorate which is represented by the following formula:

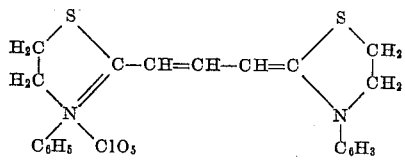

4. 7-methyl-3,3'-diphenylthiazolinocarbocyanine perchlorate which is represented by the following formula:

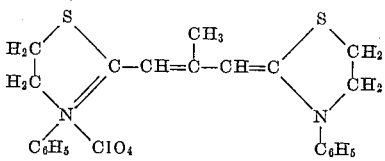

5. 3,3'-di-(α-naphthyl)thiazolinocarbocyanine perchlorate which is represented by the following formula:

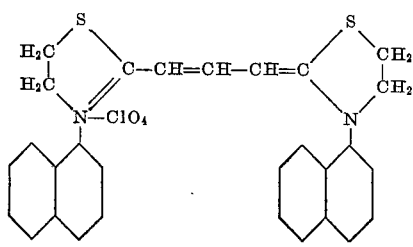

6. A process for preparing a N,N'-diarylthiazolinocarbocyanine dye comprising condensing, in the presence of an acid-binding agent, a trialkyl ester selected from among the orthoformates, orthoacetates and orthopropionates with a N-arylthiazolinium quaternary salt selected from those represented by the following general formula:

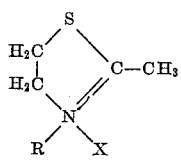

wherein R represents an aryl group and X represents an anion.

7. A process for preparing a N,N'-diarylthiazolinocarbocyanine dye comprising condensing, in the presence of an acid-binding agent, a trialkyl orthocarboxylate with a N-arylthiazolinium quaternary salt selected from those represented by the following general formula:

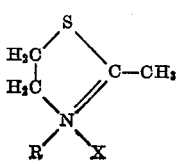

wherein R represents an aryl group selected from those of the benzene and of the naphthylene series and X represents an anion.

8. A process for preparing a N,N'-diarylthiazolinocarbocyanine dye which comprises condensing, in the presence of a tertiary amine, a trialkyl ester selected from among the orthoformates, orthoacetates, and orthopropionates with a N-arylthiazolinium quaternary salt selected from those represented by the following general formula:

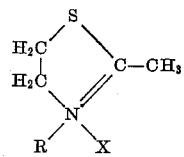

wherein R represents an aryl group selected from those of the benzene and of the naphthalene series and X represents an anion.

9. A process for preparing a N,N'-diarylthiazolinocarbocyanine dye which comprises condensing, in the presence of pyridine, a trialkyl ester selected from among the orthoformates, orthoacetates and orthopropionates with a N-arylthiazolinium quaternary salt selected from those represented by the following general formula:

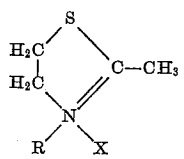

wherein R represents an aryl group selected from those of the benzene and of the naphthalene series and X represents an anion.

10. A process for preparing 3,3'-diphenylthiazolinocarbocyanine perchlorate comprising condensing, in the presence of pyridine, triethyl orthoformate with 2-methyl-3-phenylthiazolinium perchlorate.

11. A process for preparing 3,3'-di-α-naphthylthiazolinocarbocyanine perchlorate comprising condensing, in the presence of pyridine, triethyl orthoformate with 2-methyl-3-(α-naphthyl)-thiazolinium perchlorate.

12. A process for preparing 7-methyl-3,3'-diphenylthiazolinocarbocyanine perchlorate comprising condensing in the presence of pyridine, triethyl orthoacetate with 2-methyl-3-phenylthiazolinium perchlorate.

LESLIE G. S. BROOKER.

REFERENCES CITED

The following references are of record in the file of this patent:

UNITED STATES PATENTS

| Number | Name | Date |
|---|---|---|
| 1,942,854 | Brooker | Jan. 9, 1934 |
| 1,950,876 | Brooker | Mar. 13, 1934 |
| 2,245,177 | Bauer | June 10, 1941 |
| 2,330,203 | Brooker | Sept. 28, 1943 |
| 2,342,546 | Kendall | Feb. 22, 1944 |
| 2,349,179 | Kumetat | May 16, 1944 |
| 2,397,013 | Kendall | Mar. 19, 1946 |
| 2,430,845 | Middleton | Nov. 11, 1947 |